(12) United States Patent
Naglieri (10) Patent No.: US 7,698,732 B2
(45) Date of Patent: Apr. 13, 2010

(54) METHOD AND APPARATUS FOR EXCHANGING INFORMATION BETWEEN COMPUTER SYSTEMS FROM DIFFERENT COMPUTER NETWORKS

(75) Inventor: Andrea Naglieri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 11/343,578

(22) Filed: Jan. 31, 2006

(65) Prior Publication Data

US 2006/0174325 A1 Aug. 3, 2006

(30) Foreign Application Priority Data

Feb. 3, 2005 (EP) ................................. 05100759

(51) Int. Cl.
*H04L 9/32* (2006.01)
(52) U.S. Cl. .................................... 726/2; 726/3; 726/4
(58) Field of Classification Search ................. 726/2–7, 726/26–30; 713/165, 167–170; 709/217–219
See application file for complete search history.

(56) References Cited

U.S. PATENT DOCUMENTS 5,913,043 A * 6/1999 Carter et al. ................. 710/100
6,578,160 B1 * 6/2003 MacHardy et al. ............ 714/43

* cited by examiner

*Primary Examiner*—Hosuk Song
(74) *Attorney, Agent, or Firm*—Dillon & Yudell LLP (57) ABSTRACT

A method for exchanging information between computers from different computer networks without any direct connection is disclosed. The two networks include corresponding bridge computers that which share a file system residing on a common storage device. Any computer of a network needing to transmit information to a computer on the other network can map the file system of the corresponding bridge computer. The computer authenticates itself on the bridge computer, and it is then allowed to write the information into a file residing on the shared memory device. Likewise, any computer on the other network can map the same file system of the corresponding bridge computer. The computer authenticates itself on the bridge computer, and it is then allowed to read the information from a mirror copy of the file on the shared memory device. As a result, any network that is isolated from the outside can send and receive information. Such operation is possible even in the presence of virus infections without any security exposure.

6 Claims, 6 Drawing Sheets

METHOD AND APPARATUS FOR EXCHANGING INFORMATION BETWEEN COMPUTER SYSTEMS FROM DIFFERENT COMPUTER NETWORKS

RELATED PATENT APPLICATION

The present patent application claims priority to a European Application No. EP05100759.9, filed on Mar. 2, 2005.

BACKGROUND OF THE INVENTION

1. Technical Field

The present invention relates to computer networks in general, and in particular to a method for providing communications between computer networks. Still more particularly, the present invention relates to a method for exchanging information between computer systems from different computer networks.

2. Description of Related Art

In general, communications among computers within a computer network can be freely performed, but communications among computers from different computer networks are routinely restricted in some way for security reasons. A typical example is the protection of a private computer network from intruders attempting to gain unauthorized accesses to the private computer network.

The most straightforward solution for protecting a computer network with heavy access restrictions (for example, in military environments) is to isolate the computer network completely from other computer networks. However, such solution is very rigid, and it prevents any exchange of information with computers from other computer networks.

Besides, a complete isolation of a computer network is usually untenable in most practical situations, and typical examples include the use of a private computer network for implementing Internet-based applications, or the interconnection of different sub-networks in the same organization. In those cases, security concerns arise whenever a relatively secure computer network is exposed to a substantially uncontrolled external environment.

A prior art solution for providing computer security when interconnecting a secure computer network to other computer networks is to use a firewall on the secure computer network. The firewall checks all the information entering or leaving the secure computer network, and only allows certain information to transit as specified by corresponding security policies. Particularly, the security policies define which computer of an external computer network is allowed to access which computer of the secure computer network. However, each computer of the secure computer network must individually implement the control of the authorizations to read and/or write the corresponding information (by any user of the computers of the external computer network). Thus, the configuration of the computers within the secure computer network is very tedious. Moreover, the maintenance of the secure computer network is very difficult (especially in highly dynamic environments). All of the above-mentioned drawbacks make the firewall approach very undesirable, especially when the two computer networks have a minimum degree of complexity. In addition, the transit of all the information exchanged between the computer networks through the firewall adversely affects their performances.

Alternatively, it is possible to open a tunnel between selected computers of the two computer networks. The tunnel includes a communication channel that crosses the firewall with one or more point-to-point connections establishing a transparent pipe between each pair of computers. However, the tunnel solution can also impair the security of the computer systems.

Consequently, it would be desirable to provide an improved method for exchanging information between computer systems from different computer networks.

SUMMARY OF THE INVENTION

In accordance with a preferred embodiment of the present invention, a network environment includes a first network and a second network. The first network includes a source computer and a first bridge computer. The second network includes a target computer and a second bridge computer. The first bridge computer and the second bridge computer share a file system that resides on a common storage device. The method starts with the source computer that maps the file system of the first bridge computer. The source computer then writes information into a memory structure of the file system. The target computer likewise maps the file system of the second bridge computer. The target computer can now read the information from the memory structure.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
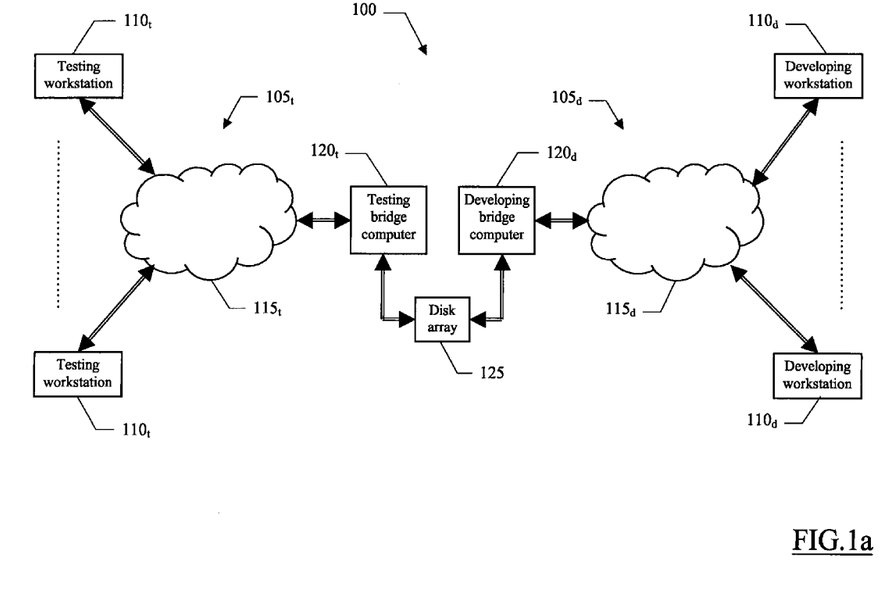
FIG. 1*a* is a block diagram of a network environment to which a preferred embodiment of the present invention is applicable.

Referring now to the drawings and in particular to FIG. 1*a*, there is depicted a block diagram of a network environment to which a preferred embodiment of the present invention is applicable. As shown, a network environment 100 includes two networks 105*d* and 105*t*, which are isolated from each other. For the present example, network 105*d* implements a developing environment, and network 105*t* implements a testing environment. Preferably, network 105*d* has heavy security requirements in order to prevent any unauthorized access to sensitive information (such as program product source code). On the other hand, the security requirements of network 105*t* are far more relaxed.

Network 105*d* includes multiple workstations 110*d* for use by software developers. Workstations 110*d* communicate through a corresponding infrastructure 115*d* such as a local-area network (LAN). A bridge computer 120*d* is coupled to communication infrastructure 115*d*. Similarly, network 105*t* includes multiple workstations 110*t* for use by software testers. Workstations 110*t* communicate through a corresponding infrastructure 115*t* such as an Internet-based network. A bridge computer 120*t* is coupled to communication infrastructure 115*t*. Bridge computer 120*d* and bridge computer 120*t* physically share a common disk array 125. Along with disk array 125, bridge computers 120*d* and 120*t* allow information to be exchanged between network 105*d* and network 105*t*.

Figure 1B:
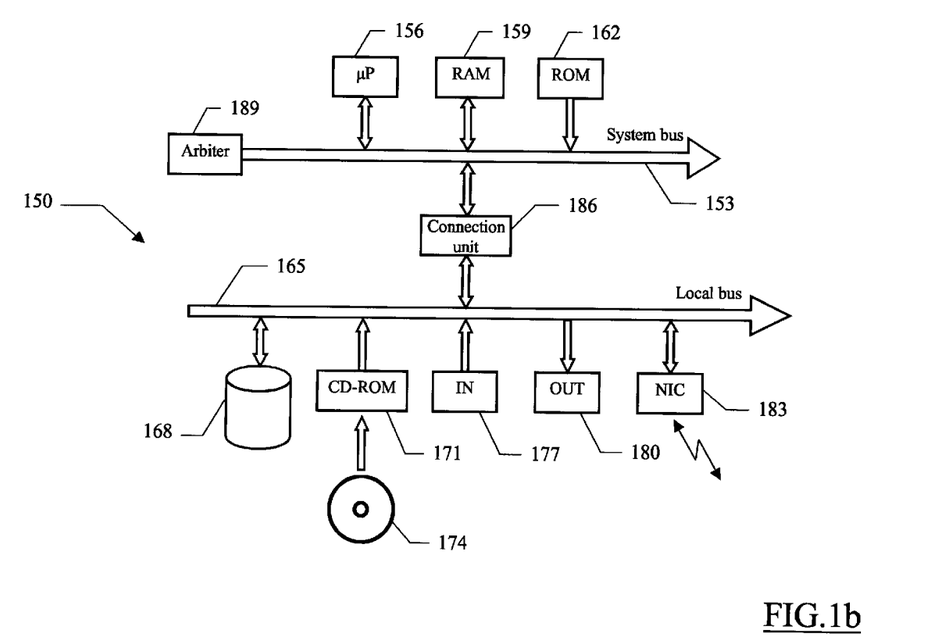
FIG. 1*b* is a block diagram of a computer within the network environment from FIG. 1, in accordance with a preferred embodiment of the present invention.

Referring now to FIG. 1*b*, there is depicted a block diagram of a computer within network environment 100, in accordance with a preferred embodiment of the present invention. A computer 150 represents all the computers in FIG. 1*a*, such as workstations 110*d*, 110*t* and bridge computers 120*d*, 120*t*. Computer 150 is formed by several units that are connected in parallel to a system bus 153. A microprocessor 156 control operation of computer 150. A random access memory (RAM) 159 is directly used as a working memory by microprocessors 156, and a read-only memory (ROM) 162 stores basic code for a bootstrap of computer 150.

Peripheral units are clustered around a local bus 165 by means of respective interfaces. In particular, a hard disk 168 is utilized for mass storage, and a CD-ROM drive 171 is utilized to read a CD-ROM 174. Computer 150 also includes input devices 177 such as a keyboard and a mouse, and output devices 180 such as a monitor and a printer. A network interface card (NIC) 183 is used to connect computer 150 to a corresponding network. A connection unit 186 is connected between system bus 153 with local bus 165. Microprocessor 156 and connection unit 186 can operate as master agents requesting an access to system bus 153 for transmitting information. An arbiter 189 manages the granting of accesses with mutual exclusions to system bus 153.

Figure 2:
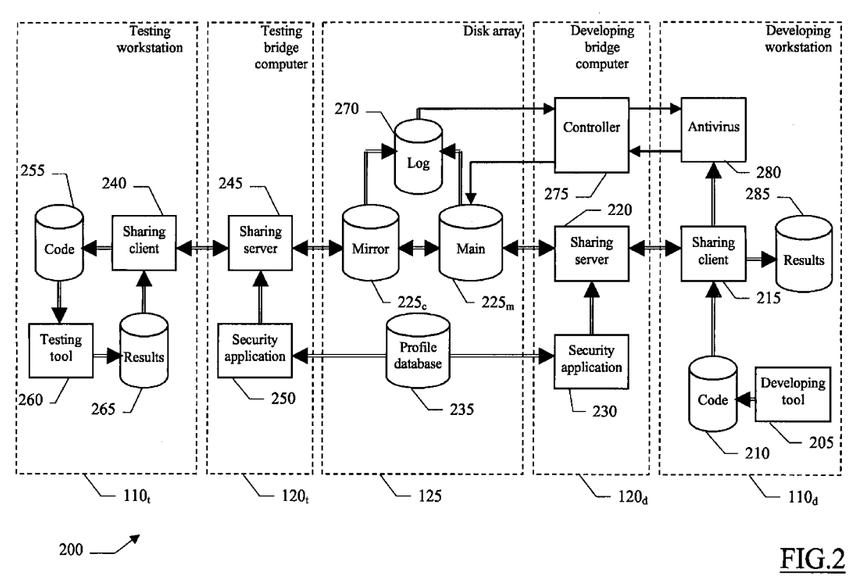
FIG. 2 depicts various software components for exchanging information between computers from different computer networks, in accordance with a preferred embodiment of the present invention.

With reference now to FIG. 2, there is depicted the main software components for exchanging information between computers from different computer networks, in accordance with to a preferred embodiment of the present invention. The main software components are denoted as a reference 200. In workstation 110*d*, a developing tool 205 is used by a software developer to create software products. Developing tool 205 generates (source and executable) code 210 that can be stored into a corresponding repository.

Code 210 can be written onto disk array 125 by means of a sharing file system service. The sharing file system service is a utility that allows developing workstations 110*d* to access remote files in the corresponding network. In the present example, the service is implemented by a sharing client 215 (running on workstation 110*d*) and a sharing server 220 (running on bridge computer 120*d*), which communicate through a corresponding protocol (designed to be platform-independent). Particularly, sharing server 220 exports a file system of bridge computer 120*d* that resides on shared disk array 125. Preferably, the exported file system is replicated on shared disk array 125 in a main copy of exported file system 225*m* and a mirror copy of exported file system 225*c*. The exported file system is then available for access by any developing bridge workstation. For this purpose, sharing client 215 mounts main copy of exported file system 225*m* from bridge computer 120*d*. As a result, exported file system 225*m* is attached to a directory tree of workstation 110*d* so as to be completely integrated into its (local) file system. In this way, workstation 110*d* can map exported file system 225*m* of bridge computer 120*d* (so as to have exported file system 225*m* look to the software developer like if it resides on workstation 110*d*).

In order to mount exported file system 225*m*, the software developer needs an account on bridge computer 120*d* (defined by a userID and a corresponding password). Sharing client 215 passes the UserID and password to sharing server 220, which authenticates the developer and grants the access to exported file system 225*m* (when authorized). An example of suitable sharing file system service is the Network File System (NFS).

Bridge computer 120*d* also runs a security application 230 for controlling the access to each resource of exported file system 225*m*. Particularly, security application 230 identifies and authenticates a software developer who wishes to access exported file system 225*m* (for example, by means of a UserID and password that are transmitted encrypted). Security application 230 then authorizes to read and/or write specific files (logging and reporting any attempt to access protected files by unauthorized users). For this purpose, security application 230 retains information about the files, the software developers, and their authorizations into a profile database 235 (which is stored on shared disk array 125). For example, security application 230 includes the Resource Access Control Facility (RACF) manufactured by the International Business Machines Corporation.

A similar sharing file system service is also available to testing workstation 110*t*. The service is also implemented by a sharing client 240 (running on workstation 110*t*) and a sharing server 245 (running on bridge computer 120*t*). However, sharing server 220 exports mirror copy of exported file system 225*c* of bridge computer 120*t* residing on shared disk array 125. Sharing server 245 makes exported file system 225*c* available indiscriminately to every software tester (through a single shared password). For example, the above-described sharing file system service can include the Common Internet File System (CIFS).

Bridge computer 120*t* also runs a security application 250 (exactly the same as the one described-above) for controlling the access to each resource of exported file system 225*c* (by identifying and authenticating the testers who wish to access its files). Security application 250 shares the same profile database 235 with security application 230 (on bridge computer 120*d*).

Workstation 110*t* reads the code in exported file system 225*c*, and copies it into a local repository 255. Code 255 is accessed by a testing tool 260, which is used by the software tester to verify the correct operation of the corresponding program products. The results of the test process are saved into a further repository 265. Results 265 are then written into exported file system 225*c* by means of the above-described sharing file system service (i.e., sharing client 240 and sharing server 245).

Any operation performed on main copy of exported file system 225*m* or on mirror copy of exported file system 225*c* is registered into a common log 270. A controller 275 running on bridge computer 120*d* monitors log 270 so as to detect any writing on mirror copy of exported file system 225*c*. The event is notified to an antivirus 280, which is installed on workstation 110*d*. In response, antivirus 280 incrementally scans mirror copy of exported file system 225*c* (i.e., its updated portion only) to detect any virus infection. When no virus is found, main copy of exported file system 225*m* is synchronized with mirror copy of exported file system 225*c*. Workstation 110*d* can now read the results in exported file system 225*m*, and copy them into a local repository 285.

Figure 3A:
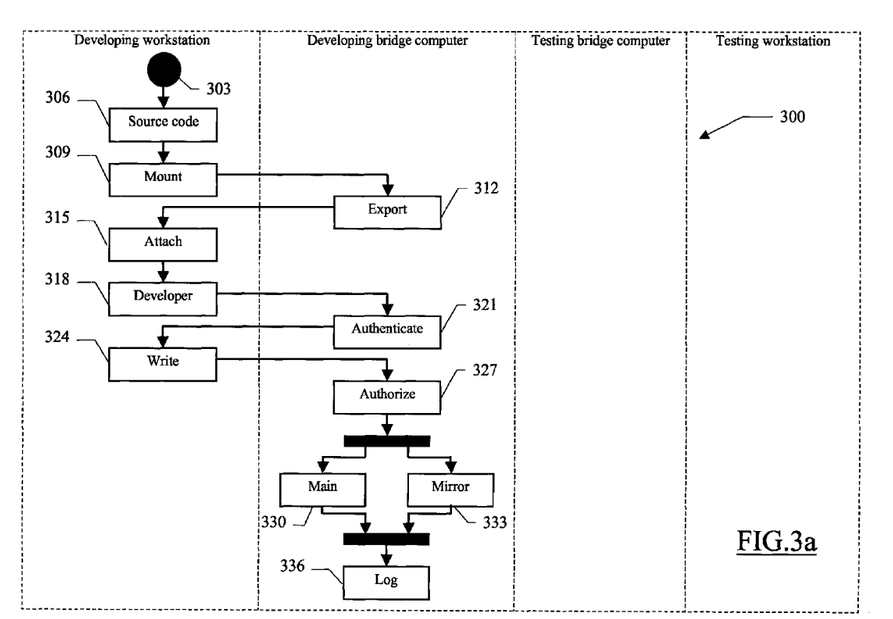
FIGS. 3*a*-3*c* are high-level logic flow diagrams of a method for exchanging information between computers from different computer networks, in accordance with to a preferred embodiment of the present invention.
Figure 3B:
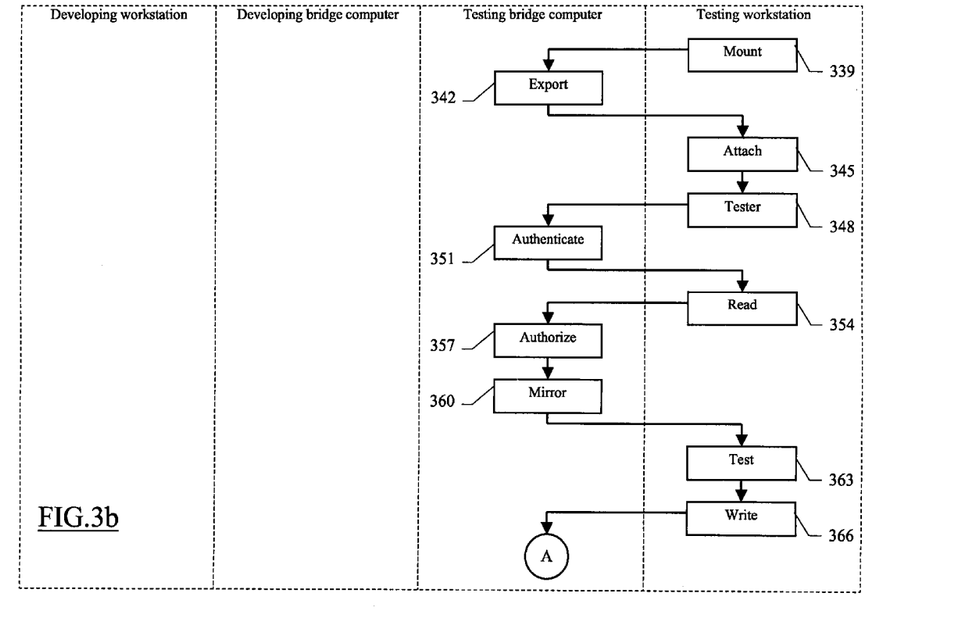
Figure 3C:
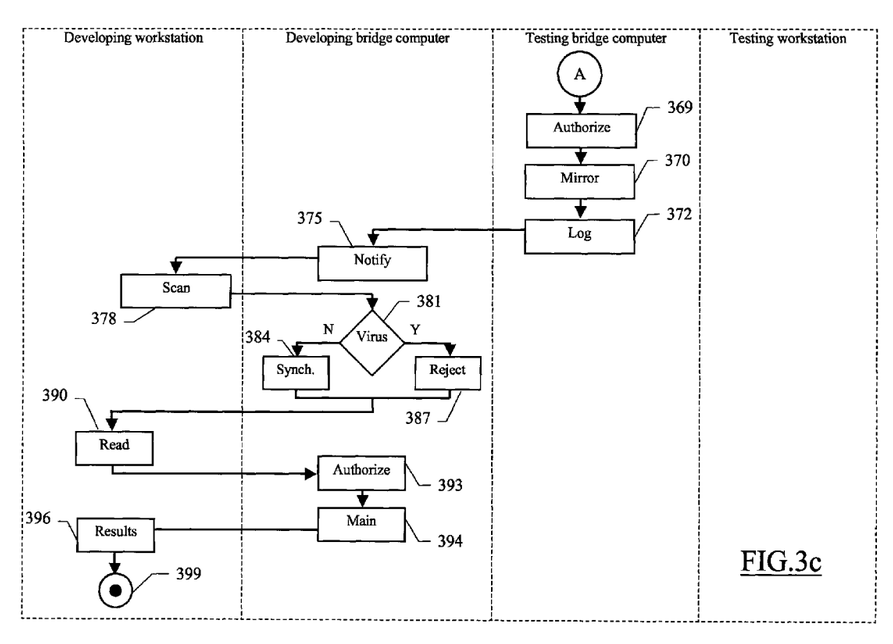

Referring now to FIGS. 3*a*-3*c*, there are illustrated high-level logic flow diagrams of a method for exchanging information between computers from different computer networks, in accordance with to a preferred embodiment of the present invention. As shown, the method begins at the black start circle 303 in the swim-lane of a generic developing workstation. Continuing to block 306, the code of a program product to be tested is made available. A software developer (who has correctly logged on the workstation) requests to mount the file system of the developing bridge computer residing on the shared disk array, as shown in block 309. Assuming that the software developer is authorized to access the files, the developing bridge computer exports the desired file system, as shown in block 312. As a result, the developing workstation attaches the exported file system to its directory tree, as depicted in block 315.

In block 318, the software developer identifies herself/himself to the security application running on the developing bridge computer. The flow of activity continues to block 321 in the swim-lane of the developing bridge computer where the security application authenticates the software developer (by means of the corresponding UserID and password). The software developer can now request to write the code of the program product into a specific exported file of the developing bridge computer, as shown in block 324. In response, the security application verifies whether the software developer (already authenticated) is authorized to perform the operation, as shown in block 327.

Assuming that the result of the verification is positive, the method forks into two branches that are executed concurrently. Particularly, the code is written into the main copy of the exported file, as shown in block 330. At the same time, the code is replicated into the mirror copy of the exported file, as depicted in block 333. The two branches eventually joint such that the operation is registered into the corresponding log, as shown in block 336.

Moving now to block 339 in the swim-lane of a generic testing workstation, a software tester (who is currently logged on the workstation) requests to mount the file system of the testing bridge computer residing on the shared disk array. Assuming that the software tester is authorized to access the file, the testing bridge computer exports the desired file system, as shown in block 342. As a result, the testing workstation attaches the exported file system to its directory tree, as depicted in block 345.

The software tester then identifies herself/himself to the security application running on the testing bridge computer, as shown in block 348. The flow of activity continues to block 351 in the swim-lane of the testing bridge computer where the security application authenticates the tester. The software tester can now request to read the code of the program product from the corresponding exported file of the testing bridge computer, as depicted in block 354. In response, the security application verifies whether the software tester is authorized to perform the operation, as shown in block 357. If so, the code is imported into the testing workstation from the mirror copy of the exported file, as depicted in block 360.

The program product is tested and the results of the process are saved into the corresponding repository, as shown in block 363. The software tester then requests to write these results into a different exported file of the testing bridge computer, as depicted in block 366. In response, the security application verifies whether or not the software tester is authorized to perform the operation, as shown in block 369.

Assuming that the result of the verification is positive, the results are written into the mirror copy of the exported file, as depicted in block 370. The operation is registered into the corresponding log, as shown in block 372. The testing bridge computer detects the event, and notifies it to the developing workstation, as depicted in block 375. In response, the anti-virus scans the mirror copy of the exported file being just updated (locking it temporarily), and returns the result of the verification to the developing bridge computer, as shown in block 378. The method then branches at decision block 381 according to the condition of the exported file. Particularly, if no virus infection has been found, the main copy of the exported file is synchronized with its mirror copy, as shown in block 384; conversely, the exported file is rejected, as depicted in block 387.

Assuming that the exported file has been accepted, the software developer can now request to read the results of the test process from the corresponding exported file of the developing bridge computer, as shown in block 390. In response, the security application verifies whether the developer is authorized to perform the operation, as shown in block 393. If so, the results are imported into the developing workstation from the main copy of the exported file, as depicted in block 396. The method then ends at the concentric white/black stop circles 399.

As has been described, the present invention provides a method for exchanging information between computers from different computer networks. Although the description reference has been made to a testing process, it is not intended to be a limitation. The method of the present invention can be applied to an exchange of any information between two computer networks without a direct connection.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for exchanging information between computers in a first network and a second network, wherein said first network includes a source computer and a first bridge computer, and said second network includes a target computer and a second bridge computer, said method comprising:

providing a file system on a common storage device, wherein said file system is shared by said first bridge computer and said second bridge computer;

mapping a file structure of said first bridge computer to a main copy and a mirror copy within said file system;

writing information from first bridge computer to said main copy and said mirror copy within said file system;

mapping a file structure of said second bridge computer to said file system;

reading said information from said mirror copy within said file system by said second bridge computer;

providing further information in response to said information being read by said target computer;

mapping said file system of said second bridge computer;

authenticating a second source user of a second source computer on said second bridge computer;

verifying an authorization of said second source user to write a memory structure of second file system;

instructing said second source computer to write second information into a second memory structure if said second source user is authorized to write a memory structure of second file system;

mapping said file system of said first bridge computer;

authenticating a second target user of a second target computer on said first bridge computer;

verifying an authorization of said second target user to read said second memory structure; and instructing said second target computer to read said second information from said second memory structure if said second target user is authorized to read said second memory structure.

2. The method of claim 1, wherein said method further includes authenticating a source user of said source computer on said first bridge computer;

verifying an authorization of said source user to write said file system; and instructing said source computer to write information into said file system if said source user is authorized to write said file system.

3. The method of claim 1, wherein said method further includes authenticating a target user of said target computer on said second bridge computer;

verifying an authorization of said target user to read said file system; and instructing said target computer to read said information from said file system if said target user is authorized to read said file system.

4. The method of claim 1, wherein said authenticating and said verifying are performed by said corresponding bridge computer using a security database.

5. The method of claim 1, wherein said method further includes:

synchronizing said main copy of said second memory structure with said mirror copy after said corresponding writing.

6. The method of claim 1, wherein said method further includes scanning said minor copy of said second memory structure to detect a harmful code infection; and enabling synchronization in response to a negative result of said scanning.

* * * * *